US009130823B2

(12) United States Patent
Park et al.

(10) Patent No.: US 9,130,823 B2
(45) Date of Patent: Sep. 8, 2015

(54) APPARATUS AND METHOD FOR CONFIGURING PERSONAL NETWORK USING PN ROUTING TABLE

(75) Inventors: Sung-Jin Park, Hwaseong-si (KR); Wuk Kim, Anyang-si (KR); Yang-Un Lee, Suwon-si (KR)

(73) Assignee: Samsung Electronics Co., Ltd (KR)

(*) Notice: Subject to any disclaimer, the term of this patent is extended or adjusted under 35 U.S.C. 154(b) by 386 days.

(21) Appl. No.: 13/164,312

(22) Filed: Jun. 20, 2011

(65) Prior Publication Data

US 2011/0310908 A1  Dec. 22, 2011

(30) Foreign Application Priority Data

Jun. 18, 2010 (KR) ........................ 10-2010-0057929

(51) Int. Cl.
- *H04L 12/28* (2006.01)
- *H04L 12/751* (2013.01)
- *H04W 4/20* (2009.01)
- *H04L 12/66* (2006.01)
- *H04L 29/06* (2006.01)
- *H04L 12/741* (2013.01)

(52) U.S. Cl.
CPC ................ *H04L 45/02* (2013.01); *H04L 12/66* (2013.01); *H04L 63/126* (2013.01); *H04W 4/203* (2013.01); *H04L 45/54* (2013.01)

(58) Field of Classification Search
USPC .................................. 370/351, 389, 400, 401
See application file for complete search history.

(56) References Cited

U.S. PATENT DOCUMENTS

| 7,024,177 | B2* | 4/2006 | Bhasin et al. ................. 455/411 |
| 7,304,974 | B2* | 12/2007 | Yang et al. .................... 370/338 |
| 8,331,853 | B2* | 12/2012 | Lee et al. ..................... 455/11.1 |
| 8,949,604 | B2* | 2/2015 | Lee et al. ..................... 713/168 |
| 9,014,055 | B2* | 4/2015 | Deprun et al. ................ 370/255 |
| 2002/0031094 | A1* | 3/2002 | Nitta ............................. 370/252 |
| 2004/0054902 | A1 | 3/2004 | Fujimoto et al. |
| 2005/0254425 | A1* | 11/2005 | Suumaki et al. .............. 370/235 |

(Continued)

FOREIGN PATENT DOCUMENTS

| CN | 101299859 | 11/2008 |
| CN | 101483611 | 7/2009 |

(Continued)

OTHER PUBLICATIONS

Open Mobile Alliance, OMA-RD-CPNS-V1_0-20091117-C, Converged Personal Network Service Requirements, Candidate Version 1.0, Nov. 17, 2009.

*Primary Examiner* — Michael J Moore, Jr.
(74) *Attorney, Agent, or Firm* — The Farrell Law Firm, P.C.

(57) ABSTRACT

A method and an apparatus are provided for configuring a Personal Network (PN). A connection request message is received from a Personal Network Entity (PNE) at the PN gateway. A registration request message for a PN, to which the PNE belongs, is transmitted from the PN gateway to a server located in a Wide Area Network (WAN). An authentication request message including ID information of the PN is received at the PN gateway from the server. The authentication request message is forwarded from the PN gateway to one or more PNEs mapped to the ID information of the PN, with reference to a PN routing table in which information about the one or more PNEs is mapped to the ID information of the PN. The one or more PNEs receive a service from the server through the PN gateway.

22 Claims, 5 Drawing Sheets

(56) References Cited

U.S. PATENT DOCUMENTS

| | | | |
|---|---|---|---|
| 2006/0146736 A1* | 7/2006 | Ro | 370/260 |
| 2009/0073983 A1 | 3/2009 | Kim | |
| 2009/0079393 A1* | 3/2009 | Teca | 320/128 |
| 2011/0201310 A1 | 8/2011 | Lee et al. | |
| 2011/0207403 A1* | 8/2011 | Kim et al. | 455/41.1 |
| 2011/0212689 A1* | 9/2011 | Kim et al. | 455/41.1 |
| 2011/0294430 A1* | 12/2011 | Lee et al. | 455/41.2 |
| 2011/0307620 A1* | 12/2011 | Park et al. | 709/229 |
| 2012/0016987 A1* | 1/2012 | Oda et al. | 709/224 |
| 2013/0077533 A1* | 3/2013 | Deprun et al. | 370/255 |
| 2013/0086246 A1* | 4/2013 | Lee et al. | 709/223 |
| 2013/0167210 A1* | 6/2013 | Chu et al. | 726/6 |
| 2013/0208626 A1* | 8/2013 | Lee et al. | 370/255 |

FOREIGN PATENT DOCUMENTS

| | | | |
|---|---|---|---|
| CN | 101489300 | | 7/2009 |
| EP | 2 086 167 | | 8/2009 |
| EP | 2086167 A1 | * | 8/2009 |
| JP | 2002-094572 | | 3/2002 |
| JP | 2002-261788 | | 9/2002 |
| JP | 2006-203546 | | 8/2006 |
| KR | 1020090027943 | | 3/2009 |
| WO | WO 02/47336 | | 6/2002 |
| WO | WO 2010/047470 | * | 4/2010 |
| WO | WO 2010/050643 | | 5/2010 |

* cited by examiner

APPARATUS AND METHOD FOR CONFIGURING PERSONAL NETWORK USING PN ROUTING TABLE

PRIORITY

This application claims priority under 35 U.S.C. §119(a) to a Korean Patent Application filed in the Korean Intellectual Property Office on Jun. 18, 2010 and assigned Serial No. 10-2010-0057929, the entire disclosure of which is incorporated herein by reference.

BACKGROUND OF THE INVENTION

1. Field of the Invention

The present invention relates generally to a device capable of Local Area Network (LAN) communication, and more particularly, to an apparatus and a method that allows a LAN communication device to receive a service from a Wide Area Network (WAN) by using a communication function of a device capable of accessing the WAN.

2. Description of the Related Art

With the dramatic increase in the use of Consumer Electronics (CE) devices capable of LAN communication, users of CE devices have sought convenient content download methods. CE devices capable of LAN communication may include MP3 players, Portable Multimedia Players (PMPs), game consoles, and netbooks.

In general, a Personal Computer (PC) is used to search the Internet for and download contents that are playable in a CE device. When the CE device and the PC are connected by a dedicated cable, the CE device downloads the contents from the PC. This process enables the CE device to play the contents. Recently, Bluetooth has been used to share contents among devices, replacing the dedicated cable.

However, CE devices still have limitations in directly accessing a WAN. For example, in order to access the WAN, some CE devices use WiFi to connect to the Internet within the coverage of an Access Point (AP). Converged Personal Network Service (CPNS) has been proposed to allow CE devices to access the WAN through a gateway to receive a desired service, such as a content download service.

Regarding the CPNS, a Personal Network (PN) is configured to include a gateway communicating with a WAN and at least one CE device playing services and contents. The CE device accesses a service/content provider of the WAN through the gateway to receive desired services or contents. The gateway in the CPNS is called a PN gateway, and the CE device, connecting to the PN gateway by LAN communication and accessing the WAN through the PN gateway, is called a Personal Network Entity (PNE).

In a CPNS system, a plurality of PNEs connect to a PN gateway and access a CPNS server through the PN gateway. In this manner, the PN gateway configures a PN with the PNEs and operates as a relay between the CPNS server and the PNEs. However, the load of the PN gateway and the CPNS server in processing separate TX/RX messages increases as the number of PNEs connecting to the PN gateway increases.

In order to avoid this increase in load, in the process of configuring a PN through the PN gateway, the PN gateway compiles information about all the PNEs into a PN document, and the CPNS server performs authentication based on the PN document. However, a large load is applied to the PN gateway when the PN gateway parses a PN document at every authentication request of the CPNS server in a registration process, extracts address information of the PNEs, and performs a routing operation.

SUMMARY OF THE INVENTION

The present invention has been made to address at least the above problems and/or disadvantages and to provide at least the advantages described below. Accordingly, an aspect of the present invention provides an apparatus and method for configuring a PN, which can reduce the processing load of a PN gateway.

Another aspect of the present invention provides an apparatus and method for configuring a PN, which makes it possible to forward authentication request messages from a CPNS server to the corresponding PNEs without parsing the authentication request messages by a PN gateway.

According to one aspect of the present invention, a method is provided for configuring a PN by a PN gateway. A connection request message is received from a PNE at the PN gateway. A registration request message for a PN, to which the PNE belongs, is transmitted from the PN gateway to a server located in a WAN. An authentication request message including ID information of the PN is received at the PN gateway from the server. The authentication request message is forwarded from the PN gateway to one or more PNEs mapped to the ID information of the PN, with reference to a PN routing table in which information about the one or more PNEs is mapped to the ID information of the PN. The one or more PNEs receive a service from the server through the PN gateway.

According to another aspect of the present invention, a method is provided for configuring a PN by a server located in a WAN. A registration request message for the PN, to which one or more PNEs belong, is received at the server from the PN gateway. An authentication request message including ID information of the PN for authentication of the PN is transmitted from the server to the PN gateway. An authentication response message is received from the PN gateway that forwards the authentication request message from the one or more PNEs mapped to the ID information of the PN. The one or more PNEs are authenticated by using the received authentication response message. The one or more PNEs receive a service from the server through the PN gateway.

According to an additional aspect of the present invention, a PN gateway is provided for configuring a PN. The PN gateway includes a LAN module for communicating with one or more PNEs, a WAN module for communicating with a server located in a WAN, and a memory unit for storing a PN routing table in which information about the one or more PNEs is mapped to ID information of the PN. The PN gateway also includes a PN routing managing unit for transmitting a registration request message for the PN to the server upon receiving a connection request message form a PNE. The PN gateway also forwards an authentication request message to the one or more PNEs mapped to the ID information of the PN, with reference to the PN routing table, upon receiving the authentication request message including the ID information of the PN from the server. The one or more PNEs receive a service from the server through the PN gateway.

According to a further aspect of the present invention, a server located in a WAN is provided for configuring a PN. The server includes a WAN module for communicating with a PN gateway. The server also includes a PN managing unit for transmitting an authentication request message including ID information of a PN for authentication of the PN upon receiving a registration request message for the PN, to which one or more PNEs below, from the PN gateway. The PN managing unit also authenticates the one or more PNEs by using an authentication response message upon receiving the authentication response message from the PN gateway, which forwards the authentication request message to the one or more PNEs mapped to the ID information of the PN. The one or more PNEs receive a service from the server through the PN gateway.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
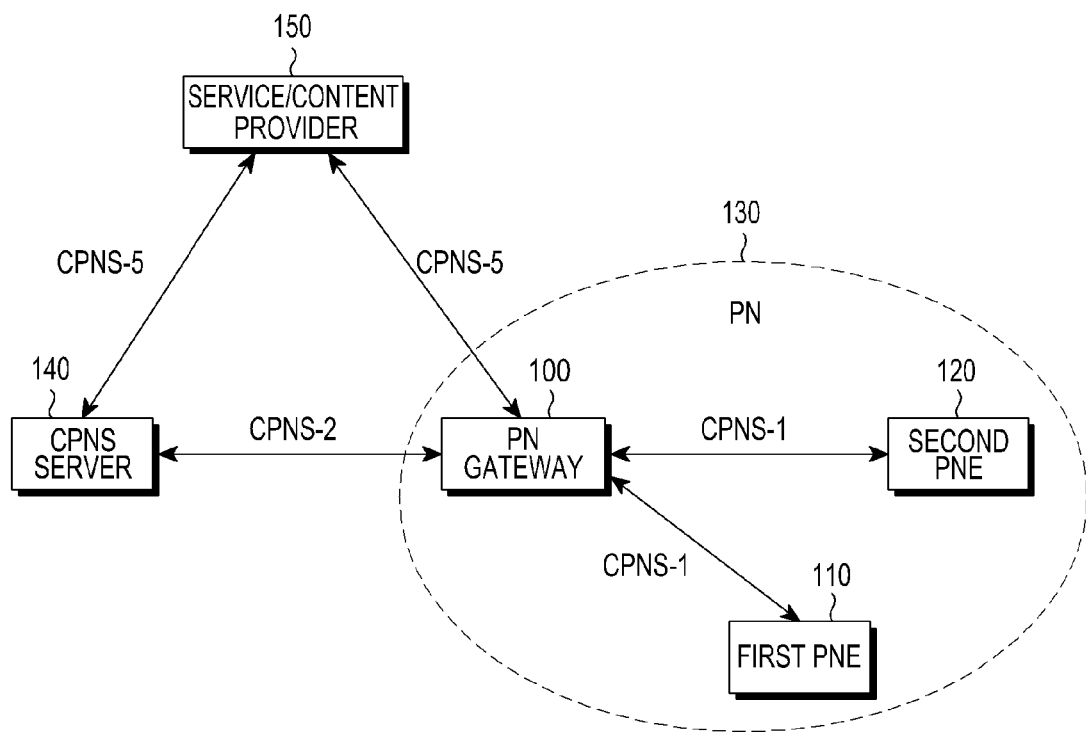
FIG. 1 is a block diagram of a CPNS system, according to an embodiment of the present invention.

Embodiments of the present invention are described in detail below in detail with reference to the accompanying drawings. The present invention may be embodied in different forms and should not be construed as limited to the embodiments set forth herein; rather, these embodiments are provided so that this disclosure will be thorough and complete, and will fully convey the scope of the present invention to those skilled in the art. The same or similar components may be designated by the same or similar reference numerals although they are illustrated in different drawings. Detailed descriptions of constructions or processes known in art may be omitted to avoid obscuring the subject matter of the present invention.

For the sake of convenience, terms regarding names of entities defined in CPNS of Open Mobile Alliance (OMA), which is an organization for standardization of applications of mobile terminals, are used to describe the present invention. However, it should be noted that the scope of the present invention is not limited by such terms, and the present invention may also be applicable to systems with similar technical backgrounds.

The present invention provides a method for using a pre-generated PN routing table to reduce the processing load of a PN gateway when the PN gateway receives an authentication request for PNEs. The PN gateway obtains information about one or more PNEs for PN configuration to generate the PN routing table. In the PN routing table, information about one or more PNEs is mapped to IDentification (ID) information of the PN. When receiving an authentication request message for the PNEs corresponding to the PN ID information from a CPNS server, the PN gateway detects the target PNEs by the PN routing table and forwards the authentication request message to the PNEs. Accordingly, the PN gateway need not parse the PN document of the message received from the CPNS server, thus significantly reducing the processing load.

An example of the CPNS system with the above function is described in detail below with reference to FIG. 1.

FIG. 1 is a block diagram of a CPNS system, according to an embodiment of the present invention.

Referring to FIG. 1, a CPNS system, according to an embodiment of the present invention, includes one or more PNEs (e.g., a first PNE 110 and a second PNE 120), a PN gateway 100, a CPNS server 140, and a service/content provider 150 serving as an application server.

The service/content provider 150 is a server that is located in a WAN to provide various services and contents.

The first and second PNEs 110 and 120 are devices that directly receive services and contents. Examples of the PNEs include MP3 players and PMPs. The first and second PNEs 110 and 120 receive contents from the service/content provider 150 and play the contents to provide services to the users. The first and second PNEs 110 and 120 are capable of LAN communication with an adjacent device (i.e., another PNE) because they include a LAN module. However, the first and second PNEs 110 and 120 cannot directly access a service provider because they do not have a WAN module. Examples of the WAN include the Internet and mobile phone networks. The PNE is also referred to as a PN device.

The first and second PNEs 110 and 120 configure a PN 130 with the PN gateway 100 by LAN communication. The configuring of the PN 130 includes detecting the support/non-support of a PN service (e.g., a CPNS) between the PN gateway 100 and the first and second PNEs 110 and 120, detecting a function between devices, and configuring a network for an application for providing a CPNS.

The PN 130 may include the PN gateway 100 and the first and second PNEs 110 and 120 connected to the PN gateway 100. Through the PN 130, the first and second PNEs 110 and 120 can use a function of the PN gateway 100 capable of accessing a WAN. Thus, the first and second PNEs 110 and 120 can access the CPNS server 140 through the PN gateway 100, and can use a CPNS to receive contents from the service/content provider 150.

The PN gateway 100 is a device that is capable of accessing the CPNS server 140 located in a WAN (i.e., a service provider network). The PN gateway 100 configures the PN 130 with the first and second PNEs 110 and 120, and relays the transmission of CPNS system messages, services, or contents between the CPNS server 140 and the first and second PNEs 110 and 120. Specifically, when receiving a service request from the first and second PNEs 110 and 120 included in the PN 130, the PN gateway 100 relays the service request to the CPNS server 140. Also, when receiving a requested service from the service/content provider 150, the PN gateway 100 transmits the requested service to the first and second PNEs 110 and 120.

When completing a physical pairing with the first and second PNEs 110 and 120 and receiving a CPNS connection request from the first and second PNEs 110 and 120, the PN gateway 100 creates a document for the PN 130 including the PN gateway 100 and the first and second PNEs 110 and 120 connected to the PN gateway 100. A registration request for the PN 130 is transmitted to the CPNS server 140.

The PN gateway 100 collects information about the first and second PNEs 110 and 120 having requested a connection with the PN gateway 100, generates a PN routing table, and stores the PN routing table. In the PN routing table, information about the first and second PNEs 110 and 120 is mapped to ID information of the PN 130 that includes the first and second PNEs 110 and 120. When receiving an authentication request for PNEs of a PN from the CPNS server 140, the PN gateway 100 uses the PN routing table to route the authentication request to the PNEs. In this manner, the PN gateway 100 stores or manages information about each PNE to facilitate the message forwarding from the CPNS server 140, thus reducing the message processing load.

In addition, the PN gateway 100 connects its own PN to another PN to exchange contents in a Peer-To-Peer (PTP) scenario. Examples of the PN gateway 100 include mobile phones, PDAs, and set-top boxes.

The CPNS server 140 registers and manages the PN gateway 100, the first and second PNEs 110 and 120, and the PN 130. The CPNS server 140 processes a service/content request received from the first and second PNEs 110 and 120 through the PN gateway 100. If the service/content corresponding to the service/content request is able to be provided by the CPNS server 140, the CPNS server 140 provides the requested service/content to the first and second PNEs 110 and 120 through the PN gateway 100. If the service/content corresponding to the service/content request is not able to be provided by the CPNS server 140, the CPNS server 140 transmits the service/content request to the service/content provider 150 to provide the requested service/content to the first and second PNEs 110 and 120 through the PN gateway 100.

The detailed operations of the first and second PNEs 110 and 120, the PN gateway 100 and the CPNS server 140 of the CPNS system are described in detail below with reference to FIGS. 2 to 4.

Figure 2:
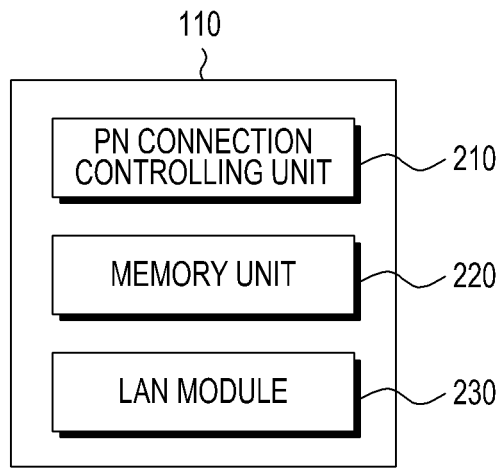
FIG. 2 is a block diagram of a PNE, according to an embodiment of the present invention.

FIG. 2 is a block diagram of the first PNE 110, according to an embodiment of the present invention. The second PNE 120 may have the same configuration as the first PNE 110. For the sake of convenience, a PN configuration process will be described in the context of the first PNE 110.

Referring to FIG. 2, the first PNE 110 includes a PN connection controlling unit 210, a memory unit 220, and a LAN module 230.

The PN connection controlling unit 210 controls the operations of the first PNE 110 associated with PN configuration/de-configuration, and controls the operations associated with service/content request and reception through a configured PN. Accordingly, in order to configure a PN, the PN connection controlling unit 210 controls the LAN module 230 to perform a physical pairing with adjacent devices to establish a communication link.

The PN connection controlling unit 210 searches the physically-paired devices for the PN gateway 100. When detecting the PN gateway 100, the PN connection controlling unit 210 transmits a PN connection request message to the PN gateway 100. Herein, the PN connection request message includes a PN connection type indicator and device information of the first PNE 110.

The PN connection controlling unit 210 receives an authentication request message transmitted from the CPNS server 140 through the PN gateway 100 in response to the PN connection request message. The authentication request message carries a PN document and includes an authentication challenge field set by the CPNS server 140. The authentication challenge field may include algorithm information and nonce value information, and the PN connection controlling unit 210 obtains a calculation result value for authentication on the basis of such information.

The PN connection controlling unit 210 creates the obtained calculation result value as a response to the authentication challenge field to change the PN document, and generates an authentication response message carrying the changed PN document. The PN connection controlling unit 210 transmits the authentication response message through the PN gateway 100 to the CPNS server 140. Thereafter, when PN configuration/registration is completed, the PN connection controlling unit 210 receives a message notifying the completion of PN configuration/registration.

The memory unit 220 stores device information of the first PNE 110 and various program data necessary for PN configuration. The device information is information about the capability and functions of the first PNE 110, which may be provided by the PNE manufacturer. The memory unit 220 also stores data received from the PN gateway 100 in response to a service/content request. Table 1 shows an example of the device information in the case where the first PNE 110 is a PMP.

TABLE 1

| Device Capability Information | |
|---|---|
| Parameter | Value |
| Device Type | Portable Media Player |
| Network Interface | Bluetooth |
| Model | PMP-YEPP T10 |
| Device Address | 002567Axxxxxx |
| Bandwidth | 1 Mbps |
| Storage | 2048 MB |
| I/O Interface | Display, Mic, Speaker |
| Video Codec | H.264 |
| Audio Codec | AC3 |
| Display Size | 6 × 4 inch |
| Resolution | 1024 × 768 |
| Battery | 30 W |
| . . . | . . . |

The LAN module 230 performs LAN communication with the PN gateway 100. Examples of the LAN module 230 include WiFi modules, Bluetooth modules, ZigBee modules, Infrared Data Association (IrDA) modules, and Visible Light Communication (VLC) modules. The LAN module 230 is used to perform a pairing operation, i.e., a connecting operation for data communication between the first PNE 110 and the PN gateway 100.

Figure 3:
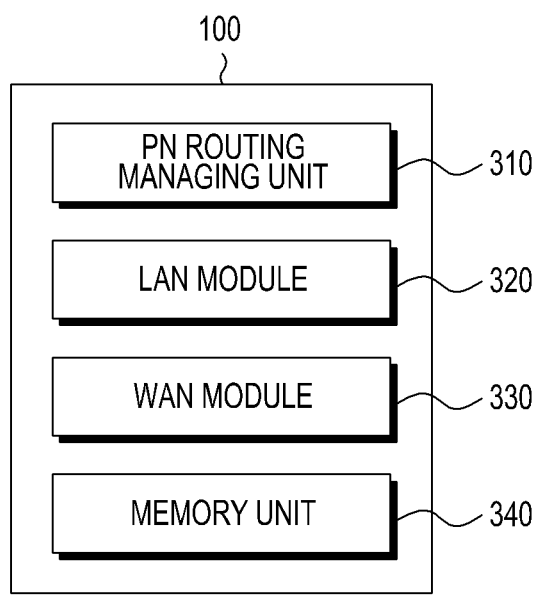
FIG. 3 is a block diagram of a PN gateway, according to an embodiment of the present invention.

FIG. 3 is a block diagram of the PN gateway 100, according to an embodiment of the present invention.

Referring to FIG. 3, the PN gateway 100 includes a PN routing managing unit 310, a LAN module 320, a WAN module 330, and a memory unit 340.

The LAN module 320 performs LAN communication with the first PNE 110. Examples of the LAN module 320 include WiFi modules, Bluetooth modules, ZigBee modules, IrDA modules, and VLC modules.

The WAN module 330 communicates data and messages with the CPNS server 140. Examples of the WAN module 330 include cellular modules and ATM modules.

The memory unit 340 stores various program data necessary for PN configuration. The memory unit 340 also stores a device list of PNEs included in the PN and device information of the PNEs. The device list and the device information may be managed on a PN-by-PN basis. The memory unit 340 also stores a PN routing table in which addresses among the device information of the PNEs are mapped to ID information of the PN (e.g., a PN ID). When receiving an authentication request for the PNEs corresponding to the PN ID from the CPNS server 140, the PN gateway 100 uses the PN routing table to route the authentication request to the addresses of the PNEs.

The PN ID may be a unique ID of the PN gateway, or may be a value obtained by changing the unique ID by a predetermined algorithm. Also, the PN ID may be allocated by the CPNS server 140.

Table 2 shows an example of the PN routing table.

TABLE 2

| Personal Network #1 | |
|---|---|
| PNE 1 | Address (IP: xxx.xxx.xxx.xxx) |
| PNE 2 | Address (Bluetooth: 00233Axxxxxx) |

When receiving a PN connection request message from the first PNE 110, the PN routing managing unit 310 detects a PN connection type indicator and device information of the first PNE 110 that are included in the PN connection request message. On the basis of the PN connection type indicator, the PN routing managing unit 310 determines whether the PN connection request from the first PNE 110 is a 1:1 connection request or a connection request for all the PNEs adjacent to the PN gateway 100.

If the PN connection type indicator is set to 'ALL', the PN routing managing unit 310 performs a pairing/discovering operation on all adjacent PNEs to perform an operation for PN configuration with the detected PNE. The PN routing managing unit 310 transmits a connection request message to the detected PNE. The connection request message from the first PNE 110 is a message that includes device information of the first PNE 100 and is transmitted to the PN gateway 100. The connection request message is a message that is referred to as 'PN Connection ASK' and is used by the PN gateway 100 to transmit a connection request to the PNE.

The connection request for all PNEs adjacent to the PN gateway 100 may be useful in providing an interactive game of the CPNS to several PNEs through one PN gateway 100. This method does not require the PNEs to separately request PN configuration with the PN gateway 100, thus reducing power consumption, such as network resources and device resources.

The PN routing managing unit 310 obtains an address from the device information of each of a response message for the connection request message to the detected PNE and the connection request message from the first PNE 110. The PN routing managing unit 310 allocates PN ID information to a PN for the detected PNEs, generates a PN routing table in which the PN ID information is mapped to the addresses of the PNEs included in the PN, and stores the PN routing table in the memory unit 340.

The PN routing managing unit 310 creates a PN document including information about a PN. In this manner, when configuring a PN, the PN routing managing unit 310 compiles information about all the PNEs of the PN into a PN document. The PN document may include a list of devices in the PN, and the device list may include device information of each PNE. The PN document includes PN ID information. The PN routing managing unit 310 transmits a PN registration request message carrying the created PN document to the CPNS server 140. The PN document may include only the device list except the device information of each PNE. Table 3 shows an example of the PN document generated by the PN gateway 100.

TABLE 3

| Personal Network #1 - Identity PN GW Info. PNE #1 | |
|---|---|
| Parameter | Value |
| Device Info. | |
| Device Name | Portable Media Player |
| Network Interface | Bluetooth |

TABLE 3-continued

| Personal Network #1 - Identity PN GW Info. PNE #1 | |
|---|---|
| Parameter | Value |
| Bandwidth | 1 Mbps |
| Storage | 2048 MB |
| I/O Interface | Display, Mic, Speaker |
| Video Codec | H.264 |
| Audio Codec | AC3 |
| Display Size | 6 × 4 inch |
| Resolution | 1024 × 768 |
| Battery | 30 W |
| ... | ... |
| Content Info. | |
| Music | Seo Tae-ji Album #8 |
| Movie | Terminator #4 |
| ... | ... |
| PNE #2 | |
| PNE #3 | |
| ... | |

The PN routing managing unit 310 receives an authentication request message transmitted from the CPNS server 140 in response to the PN registration request message. Because the CPNS server 140 requests authentication of the PNEs in the PN document, the PN routing managing unit 310 detects information about the PNEs in the PN document. According to an embodiment of the present invention, the PN routing managing unit 310 detects addresses of target PNEs by using the generated PN routing table, without parsing the PN document.

Specifically, the PN routing managing unit 310 detects PN ID information of an authentication request message. The PN routing managing unit 310 searches the PN routing table for the address of the PNE mapped to the detected PN ID information. The authentication request message carries the PN document changed by the CPNS server 140, but the PN routing managing unit 310 only detects the PN ID information. Therefore, the PN routing managing unit 310 need not parse or unpack the PN document of the authentication request message in order to obtain the address information of each PNE. Thus, after searching the PN routing table to detect the address of the PNE to receive the authentication request message, the PN routing managing unit 310 forwards the authentication request message to the PNEs on the basis of the detected address of the PNE.

The PN routing managing unit 310 receives an authentication response message transmitted from each PNE in response to the authentication request message. According to an embodiment of the present invention, the PN routing managing unit 310 collects authentication response messages from the PNEs, generates an integrated authentication response message, and transmits the integrated authentication response message to the CPNS server 140. In the integrated authentication response message, the PN documents in the authentication response messages from the PNEs are also combined into an integrated PN document. Herein, the PN routing managing unit 310 changes the PN documents from the PNEs to create the integrated PN document.

According to another embodiment of the present invention, whenever receiving an authentication response message from each of the PNEs, the PN routing managing unit 310 transmits the authentication response message to the CPNS server 140. The CPNS server 140 authenticates the PNEs, creates an integrated PN document, and transmits an integrated registration response message carrying the integrated PN document to the PN routing managing unit 310. When receiving the integrated registration response message from the CPNS server 140, the PN routing managing unit 310 notifies the PNEs of completion of PN configuration/registration with reference to the PN routing table as described above.

Figure 4:
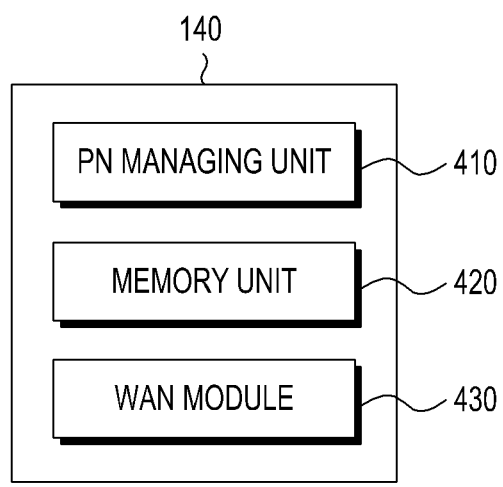
FIG. 4 is a block diagram of a CPNS server, according to an embodiment of the present invention.

FIG. 4 is a block diagram of the CPNS server 140, according to an embodiment of the present invention.

Referring to FIG. 4, the CPNS server 140 includes a PN managing unit 410, a memory unit 420, and a WAN module 430.

The WAN module 430 communicates with the PN gateway 100 and the service/content provider 150.

The memory unit 420 stores various services and contents received from the service/content provider 150.

The PN managing unit 410 controls an overall operation of the CPNS server 140. When receiving a PN registration request message from the PN gateway 100, the PN managing unit 410 detects a PN document included in the PN registration request message. The PN managing unit 410 performs CPNS user authentication and authorization on the PNE in the PN document and stores this in the memory unit 420. If PN ID information is not allocated to the PN included in the PN document, an ID is allocated as the PN ID information. If the PN ID information is already allocated, a redundancy check is performed to determine whether the prestored PN ID information also includes the allocated PN ID information. In this manner, the PN ID information may be allocated by the PN gateway 100 or by the CPNS server 140. If the PN ID information is allocated by the CPNS server 140, it does not require a redundancy check.

In order to perform CPNS user authentication and authorization on the PNE in the PN document, the PN managing unit 410 changes the PN document to include an authentication challenge field for each PNE. The PN managing unit 410 extracts target PN ID information from the PN document and generates an authentication request message including the PN ID information. The changed PN document is carried in the authentication request message. However, only the PN ID information is carried in the authentication request message so that the PN gateway 100 can easily search the PN routing table for the addresses of PNEs by detecting only the PN ID information. Accordingly, the PN gateway 100 can detect the addresses of the PNEs mapped to the PN ID information, even without parsing the PN document in the authentication request message to extract the addresses of the PNEs.

Table 4 shows an example of the PN document changed by the CPNS server 140.

TABLE 4

| Personal Network #1 - Identity |  |
| --- | --- |
| PN GW Info. | |
| PNE #1 | |
| <Authentication challenge: nonce=A34Cm+Fva37UYWpGNB34JP, algorithm=AKAv1-MD5, response=?> | |
| Parameter | Value |
| Device Info. | |
| Device Name | Portable Media Player |
| Network Interface | Bluetooth |
| Bandwidth | 1 Mbps |
| Storage | 2048 MB |
| I/O Interface | Display, Mic, Speaker |
| Video Codec | H.264 |
| Audio Codec | AC3 |
| Display Size | 6 x 4 inch |
| Resolution | 1024 x 768 |
| Battery | 30 W |

TABLE 4-continued

| Personal Network #1 - Identity |  |
| --- | --- |
| PN GW Info. | |
| PNE #1 | |
| <Authentication challenge: nonce=A34Cm+Fva37UYWpGNB34JP, algorithm=AKAv1-MD5, response=?> | |
| Parameter | Value |
| . . . | . . . |
| Content Info. | |
| Music | Seo Tae-ji Album #8 |
| Movie | Terminator #4 |
| . . . | . . . |
| PNE #2 | |
| <Authentication challenge: nonce=A34Cm+Fva37UYWpGNB34JP, algorithm=AKAv1-MD5, response=?> | |
| PNE #3 | |
| <Authentication challenge: nonce=A34Cm+Fva37UYWpGNB34JP, algorithm=AKAv1-MD5, response=?> | |
| . . . | |

The PN managing unit 410 transmits the authentication request message to the PN gateway 100 and receives an authentication response message from the PN gateway 100. The PN managing unit 410 completes the authentication of each PNE by determining whether a reply to an authentication challenge field of the authentication response message is identical to its own reply. Thereafter, the PN managing unit 410 generates a registration response message notifying the completion of PN registration, and transmits the registration response message to the PN gateway 100.

Figure 5:
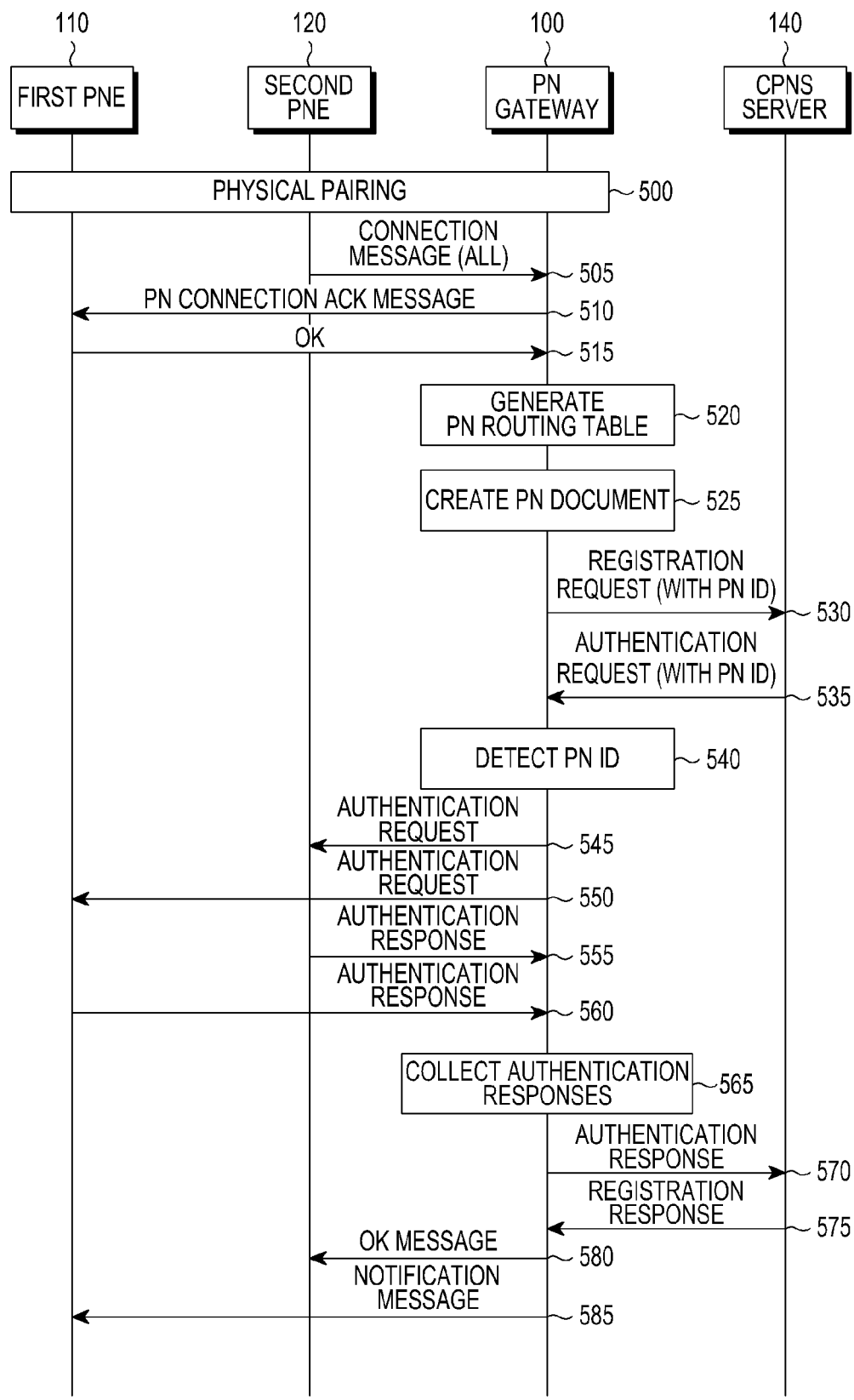
FIG. 5 is a flow diagram illustrating a PN configuration/registration process using a PN routing table, according to a first embodiment of the present invention.

FIG. 5 is a flow diagram illustrating a PN configuration/registration process using a PN routing table, according to a first embodiment of the present invention. In FIG. 5, the second PNE 120 requests a PN network connection, and the first PNE 110 participates in a PN configuration/registration process at the participation request of the second PNE 120.

Referring to FIG. 5, in step 500, the PN gateway 100 performs an operation for data communication (i.e., a physical pairing operation) by LAN communication with the first PNE 110 and the second PNE 120.

In step 505, the second PNE 120 transmits a PN connection request message to the PN gateway 100. The PN connection request message includes a PN connection type indicator and device information of the second PNE 120. Specifically, the second PNE 120 may use the PN connection type indicator to select one of a separate connection mode for configuring a PN by itself and an integrated connection mode for configuring a PN in combination with all adjacent PNEs.

When receiving the PN connection request message, the PN gateway 100 determines the PN connection type indicator of the PN connection request message. If the PN connection type indicator indicates the separate connection mode, the PN gateway 100 configures a PN with the second PNE 120 in a PTP scenario. If the PN connection type indicator indicates the integrated connection mode, the PN gateway 100 configures a PN in combination with all adjacent PNEs. When the integrated connection mode is indicated, in step 510, the PN gateway 100 transmits a PN connection ACKnowledgement (ACK) message to the first PNE 110, which is one of the adjacent PNEs.

The PN connection request message of step 505 and the PN connection ACK message of step 510 have the same message format. However, the PN connection request message is transmitted from the PNE to the PN gateway 100, and the PN connection ACK message is used by the PN gateway 100 to make a connection request to the PNE.

If intending to participate in PN configuration, the first PNE 110, having received the PN connection ACK message, transmits a response message including device information of the first PNE 110 to the PN gateway 100, in step 515. If not intending to participate in PN configuration, the first PNE 110 transmits a Non-ACKnowledgement (NACK) message to the PN gateway 100. When receiving the response message from the first PNE 110, the PN gateway 100 uses the PN connection request message of the second PNE 120 and the response message of the first PNE 110 to generate a PN routing table in step 520. Specifically, the PN gateway 100 obtains PNE addresses from the device information of the second PNE 120 in the PN connection request message and the device information of the first PNE 110 in the response message, allocates PN ID information to a PN, and maps the allocated PN ID information to the obtained PNE addresses, thereby generating the PN routing table.

In step 525, the PN gateway 100 creates a PN document. The PN document includes at least one of a list of PNEs included in a PN and information about the PN including the PNEs (i.e., PN ID information). The device list may include device information of each PNE. The PN document may also include information about contents of each PNE.

In step 530, the PN gateway 100 generates a PN registration request message including the PN document. In step 530, the PN gateway 100 transmits the PN registration request message to the CPNS server 140. The CPNS server 140 detects the PN document included in the PN registration request message. The CPNS server 140 searches target PNEs on the basis of the device information or the device list in the PN document. When the target PNEs are detected, an authentication/authorization operation is performed to authenticate the PNEs as CPNS users. The CPNS server 140 generates an authentication request message for each PNE and transmits the authentication request message to the PN gateway 100 in step 535. The authentication request message carries a PN document including target PN ID information.

Although the PN ID information has been described as being allocated by the PN gateway 100, the PN ID information may also be allocated by the CPNS server 140. Also, IDs may be allocated by the CPNS server 140 to identify the PN gateway 100 and the PNEs.

If the PN ID information is allocated by the PN gateway 100, the PN ID information is included in the PN document carried in the PN registration request message. Thus, the CPNS server 140 extracts the PN ID information, allocated by the PN gateway 100, from the PN document, and includes the extracted PN ID information in the authentication request message.

If the PN ID information is not allocated by the PN gateway 100, the CPNS server 140 allocates PN ID information to target PNEs because it can detect the target PNEs from the device list in the PN document. The CPNS server 140 includes the allocated PN ID information in the authentication request message.

If the PN ID information is allocated by the CPNS server 140, the PN routing table of step 520 may be generated after obtaining the allocated PN ID information from the CPNS server 140, and the PN document of step 525 may include only the device list of PNEs.

When receiving the authentication request message from the CPNS server 140, the PN gateway 100 detects the PN ID information of the authentication request message in step 540. The PN gateway 100 detects the addresses of the PNEs mapped to the detected PN ID information with reference to the PN routing table. The PN document in the authentication request message is not parsed. In steps 545 and 550, the PN gateway 100 forwards the authentication request message of the CPNS server 140 to the first and second PNEs 110 and 120 based on the addresses of the PNEs.

When receiving the authentication request message from the PN gateway 100, each of the first and second PNEs 110 and 120 parses the PN document of the authentication request message. Because the parsing of the PN document is performed by each of the PNEs, the processing load of the PN gateway 100 is reduced. The PN document is parsed to detect an authentication challenge field, and a reply for authentication is obtained with reference to the authentication challenge field. The first and second PNEs 110 and 120 obtain a reply to the authentication challenge field, change the PN document, generate an authentication response message carrying the changed PN document, and transmit the authentication response message to the PN gateway 100, in steps 555 and 560.

In step 565, the PN gateway 100 collects the authentication response messages from the first and second PNEs 110 and 120. The PN gateway 100 obtains the PN documents from the collected authentication response messages, combines the obtained PN documents into an integrated PN document, and transmits an authentication response message carrying the integrated PN document to the CPNS server 140, in step 570. When receiving the authentication response message from the PN gateway 100, the CPNS server 140 authenticates each PNE on the basis of a reply to the authentication challenge field. If the authentication is successful, the CPNS server 140 transmits a registration response message to notify the completion of PN registration to the PN gateway 100, in step 575. In step 580, the PN gateway 100 generates and transmits an OK message to notify the success of PN configuration/registration to the second PNE 120. In step 585, the PN gateway 100 generates and transmits a notification message to notify the success of PN configuration/registration to the first PNE 110.

Figure 6:
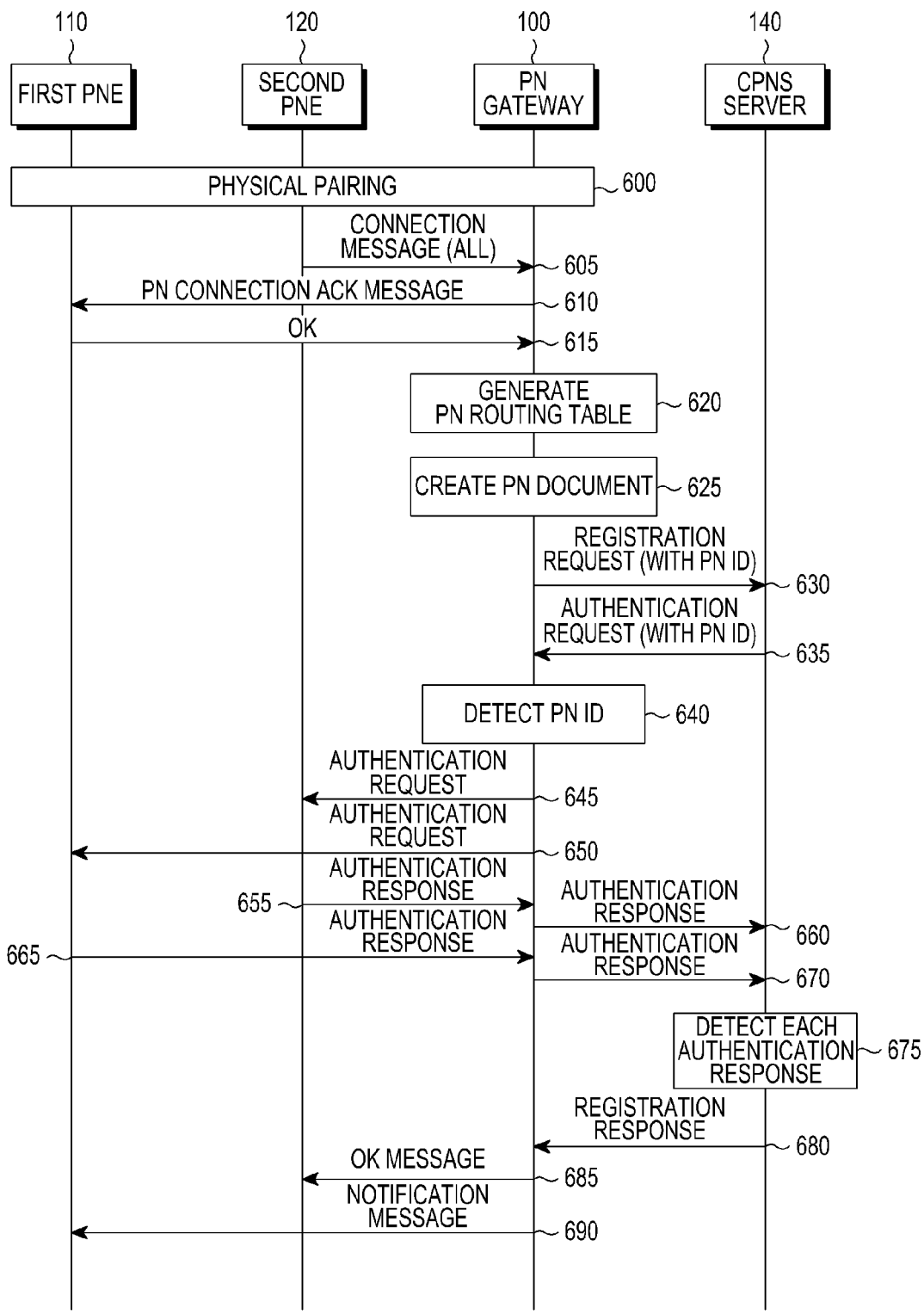
FIG. 6 is a flow diagram illustrating a PN configuration/registration process using a PN routing table, according to a second embodiment of the present invention.

FIG. 6 is a flow diagram illustrating a PN configuration/registration process using a PN routing table, according to a second embodiment of the present invention. Steps 600 to 655 and 665 of FIG. 6 are identical to steps 500 to 560 of FIG. 5, and thus a detailed description of these step in FIG. 6 is provided above with reference to FIG. 5.

In the first embodiment of the present invention, the PN gateway 100 combines the PN documents of the authentication response messages, received from the first and second PNEs 110 and 120, into an integrated PN document. However, in the second embodiment of the present invention, the PN gateway 100 separately transmits the authentication response messages, received from the first and second PNEs 110 and 120, to the CPNS server 140 in steps 660 and 670. In step 675, the CPNS server 140 parses the PN documents of the authentication response messages and authenticates the PNEs on the basis of a reply to the authentication challenge field. In step 680, the CPNS 140 generates an integrated PN document and transmits a registration response message carrying the integrated PN document to the PN gateway 100. The PN gateway 100 detects the address of each PNE with reference to the PN routing table. Steps 685 and 690 of FIG. 6 are identical to steps 580 and 585 of FIG. 5. The PN gateway 100 need not generate an integrated PN document in the second embodiment of the present invention, thus reducing the processing load of the PN gateway 100.

As described above, according to the present invention, the PNE configures a PN with the PN gateway for registration with the CPNS server to provide a CPNS. A PN configuration process of embodiments of the present invention is not a series of operations for simply combining devices into a group, but is a method for LAN PNEs to receive a service from a WAN through a PN gateway capable of accessing the service provider network.

When receiving a message for authentication from the CPNS server, the present invention detects a target PNE by using a PN routing table, generated by the PN gateway at the PN configuration time, without parsing the PN document, and forwards an authentication message to the target PNE. This makes it possible to reduce the processing load of the PN gateway for processing the PN document for PN registration/authentication.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for configuring a Personal Network (PN) by a PN gateway comprising the steps of:
   receiving a connection request message from a Personal Network Entity (PNE);
   determining a PN connection mode included in the connection request message;
   if the connection mode involves participation of all PNEs, transmitting the connection request message to other PNEs, and receiving a connection response message allowing PN participation from the other PNEs, in response to the connection request message;
   establishing the PN with one or more PNEs at the PN gateway in accordance with the connection mode;
   generating a PN routing table in which information about the one or more PNEs is mapped to IDentification (ID) information of the PN;
   receiving an authentication request message including the ID information of the PN at the PN gateway from a server; and
   forwarding the authentication request message from the PN gateway to one or more PNEs identified with the ID information of the PN, with reference to the PN routing table;
   wherein the one or more PNEs receive a service from the server through the PN gateway.

2. The method of claim 1, further comprising obtaining the information about the one or more PNEs, which is included in a message requesting PN establishment received from the one or more PNEs.

3. The method of claim 1, further comprising:
   allocating ID information of the PN including the one or more PNEs; and
   storing the PN routing table.

4. The method of claim 1, wherein the information about the one or more PNEs comprises PNE address information.

5. The method of claim 1, further comprising:
   generating a PN document including at least one of the information about the one or more PNEs and the ID information of the PN; and
   generating a registration request message carrying the PN document; and
   transmitting the registration request message to the server.

6. The method of claim 5, wherein the information about the one or more PNEs includes a device list of the one or more PNEs.

7. The method of claim 1, further comprising transmitting an authentication response message to the server when the authentication response message is received from the one or more PNEs.

8. The method of claim 1, further comprising:
   collecting at least one authentication response message received from each of the one or more PNEs;
   combining PN documents into an integrated PN document, wherein each PN document is carried in a respective authentication response message and includes information about a respective PNE and ID information of the PN; and
   transmitting a secondary authentication response message carrying the integrated PN document to the server.

9. The method of claim 5, further comprising:
   receiving a registration response message from the server; and
   transmitting one or more messages notifying the one or more PNEs of completion of registration of the PN with reference to the PN routing table.

10. A method for configuring a Personal Network (PN) by a server located in a wide area network (WAN), comprising the steps of:
    receiving a request message for establishing the PN, to which one or more Personal Network Entities (PNEs) belong, at the server from a PN gateway;
    transmitting an authentication request message including IDentification (ID) information of the PN for authentication of the one or more PNEs from the server to the PN gateway;
    receiving an authentication response message from the PN gateway that forwards the authentication request message to the one or more PNEs identified using the ID information of the PN in a PN routing table;
    authenticating the one or more PNEs by comparing a reply of the server with a reply to an authentication challenge field included in the authentication response message;
    registering the PN when the one or more PNEs are authenticated;
    generating a PN document in response to the authentication of the one or more PNEs; and
    transmitting a response message carrying the generated PN document for establishing the PN to the PN gateway;
    wherein the one or more PNEs receive a service from the server through the PN gateway.

11. The method of claim 10, wherein the request message carries a PN document including at least one of information about the one or more PNEs and ID information of the PN.

12. The method of claim 11, further comprising:
    detecting the one or more PNEs as authentication targets based on the information about the one or more PNEs in the PN document;
    generating the authentication request message including the authentication challenge field for authenticating the detected one or more PNEs; and
    carrying the PN document, including the ID information of the PN, in the authentication request message.

13. The method of claim 10, further comprising:
    allocating ID information of the PN including the one or more PNEs; and
    including the allocated ID information of the PN in the authentication request message.

14. A Personal Network (PN) gateway for configuring a PN, comprising:
    a first interface unit configured to communicate with one or more Personal Network Entities (PNEs);
    a second interface unit configured to communicate with a server located in a WAN;
    a controller configured to receive a connection request message from a PNE, determine a PN connection mode included in the connection request message, transmit the connection request message to other PNEs and receive a connection response message allowing PN participation from the other PNEs in response to the connection request message if the connection mode involves participation of all PNEs, establish a PN with the one or more PNEs in accordance with the connection request message, generate a PN routing table in which information about the one or more PNEs is mapped to IDentification (ID) information of the PN, receive an authentication request message including the ID information of the PN from a server, and forward the authentication request message to one or more PNEs identified with the ID information of the PN, with reference to the PN routing table; and a memory unit storing the PN routing table, wherein the one or more PNEs receive a service from the server through the PN gateway.

15. The PN gateway of claim 14, wherein the controller obtains the information about the one or more PNEs included in a message requesting PN establishment received from the one or more PNEs, allocates the ID information of the PN including the one or more PNEs, and stores the PN routing table in the memory unit.

16. The PN gateway of claim 14, wherein the controller collects an authentication response message when the authentication response message is received from each of the one or more PNEs, combines PN documents into an integrated PN document and transmits a secondary authentication response message carrying the integrated PN document to the server, wherein each PN document is carried in a respective authentication response message and includes information about a respective PNE and ID information of the PN.

17. A server located in a Wide Area Network (WAN) for configuring a Personal Network (PN), comprising:
an interface unit configured to communicate with a PN gateway; and
a controller configured to transmit an authentication request message including IDentification (ID) information of a PN for authentication of one or more Personal Network Entities (PNEs) upon receiving a request message for establishing the PN, to which the one or more PNEs belong, from the PN gateway, receive an authentication response message from the PN gateway that forwards the authentication request message to the one or more PNEs identified using the ID information of the PN in a PN routing table, authenticate the one or more PNEs by comparing a reply of the server with a reply to an authentication challenge field included in the authentication response message, register the PN when the one or more PNEs are authenticated, generate a PN document in response to the authentication of the one or more PNEs, and transmit a response message carrying the generated PN document for establishing the PN to the PN gateway,
wherein the one or more PNEs receive a service from the server through the PN gateway.

18. The server of claim 17, wherein the controller detects the one or more PNEs as authentication targets based on the information about the one or more PNEs and the ID information of the PN included in a PN document carried in the request message, generates the authentication request message; and transmits the authentication request message including the ID information of the PN.

19. A method for configuring a Personal Network (PN) by a PN gateway comprising the steps of:
establishing the PN with one or more Personal Network Entities (PNEs) at the PN gateway;
generating a PN routing table in which information about the one or more PNEs is mapped to IDentification (ID) information of the PN;
receiving an authentication request message including the ID information of the PN at the PN gateway from a server;
identifying the information about the one or more PNEs from the PN routing table using the ID information of the PN received in the authentication request message;
forwarding the authentication request message from the PN gateway to the one or more PNEs using the information about the one or more PNEs identified from the routine table;
collecting at least one authentication response message received from each of the one or more PNEs;
combining PN documents into an integrated PN document, wherein each PN document is carried in a respective authentication response message and includes information about a respective PNE and ID information of the PN; and
transmitting a secondary authentication response message carrying the integrated PN document to the server;
wherein the one or more PNEs receive a service from the server through the PN gateway.

20. A method for configuring a Personal Network (PN) by a server located in a wide area network (WAN), comprising the steps of:
receiving a request message for establishing the PN, to which one or more Personal Network Entities (PNEs) belong, at the server from a PN gateway;
transmitting an authentication request message including IDentification (ID) information of the PN for authentication of the one or more PNEs from the server to the PN gateway;
receiving an authentication response message from the PN gateway that forwards the authentication request message to one or more PNEs using information about the one or more PNEs identified from a PN routing table using the ID information of the PN;
registering the PN in response to the received authentication response message;
generating a PN document in response to the authentication of the one or more PNEs; and
transmitting a response message carrying the generated PN document for establishing the PN to the PN gateway;
wherein the one or more PNEs receive a service from the server through the PN gateway.

21. A Personal Network (PN) gateway for configuring a PN, comprising:
a first interface unit configured to communicate with one or more Personal Network Entities (PNEs);
a second interface unit configured to communicate with a server located in a WAN;
a controller configured to establish a PN with the one or more PNEs, generate a PN routing table in which information about the one or more PNEs is mapped to IDentification (ID) information of the PN, receive an authentication request message including the ID information of the PN from a server, identify the information about the one or more PNEs from the PN routing table using the ID information of the PN received in the authentication request message, forward the authentication request message to one or more PNEs using the information about the one or more PNEs identified from the PN routing table, collect at least one authentication response message received from each of the one or more PNEs, combine PN documents into an integrated PN document, wherein each PN document is carried in a respective authentication response message and includes information about a respective PNE and ID information of the PN, and transmit a secondary authentication response message carrying the integrated PN document to the server; and a memory unit storing the PN routing table, wherein the one or more PNEs receive a service from the server through the PN gateway.

22. A server located in a Wide Area Network (WAN) for configuring a Personal Network (PN), comprising:

an interface unit configured to communicate with a PN gateway; and a controller configured to transmit an authentication request message including IDentification (ID) information of a PN for authentication of one or more Personal Network Entities (PNEs) upon receiving a request message for establishing the PN, to which the one or more PNEs belong, from the PN gateway, receive an authentication response message from the PN gateway that forwards the authentication request message to one or more PNEs using information about the one or more PNEs identified from a PN routing table using the ID information of the PN, register the PN in response to the authentication response message, generate a PN document in response to the authentication of the one or more PNEs, and transmit a response message carrying the generated PN document for establishing the PN to the PN gateway, wherein the one or more PNEs receive a service from the server through the PN gateway.

* * * * *